UNITED STATES PATENT OFFICE.

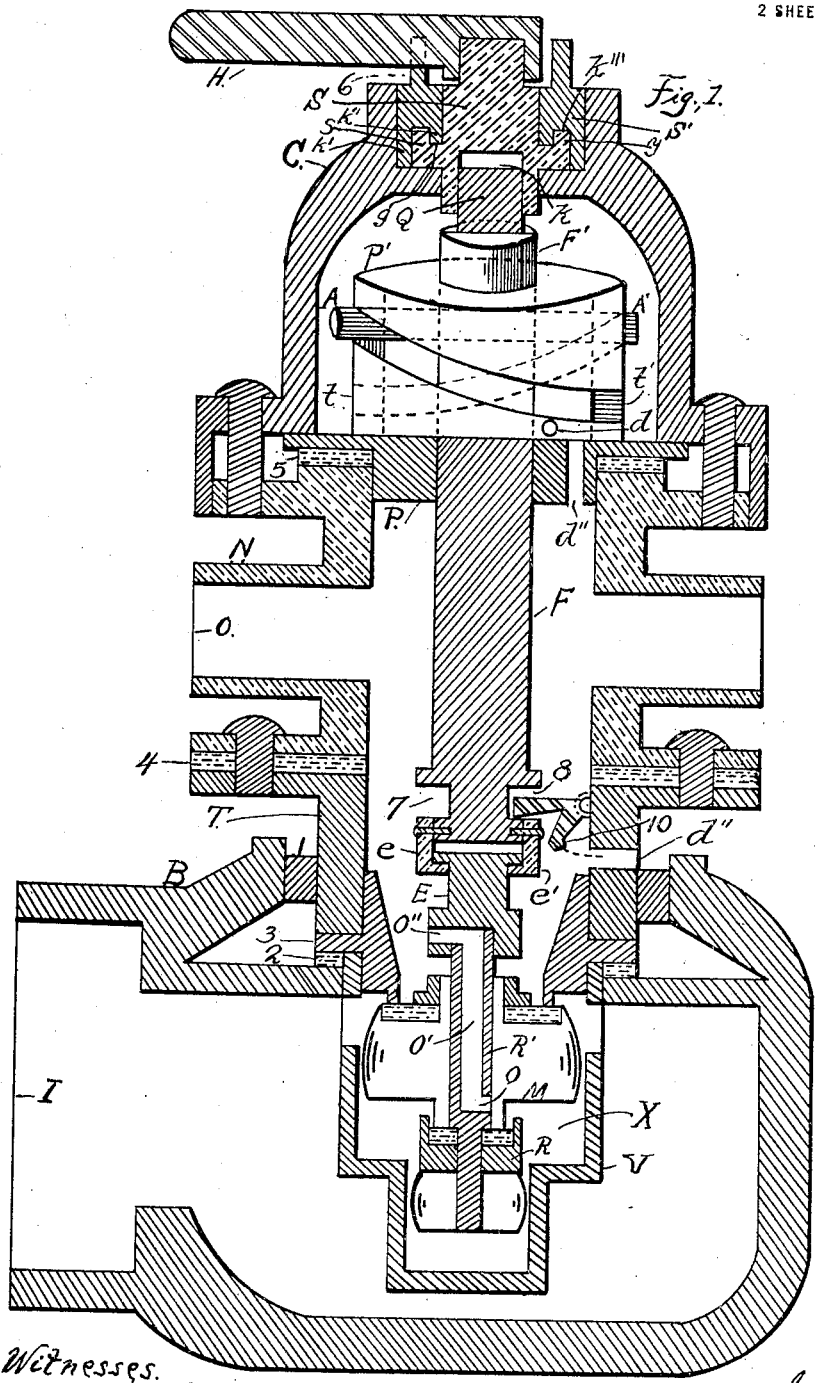

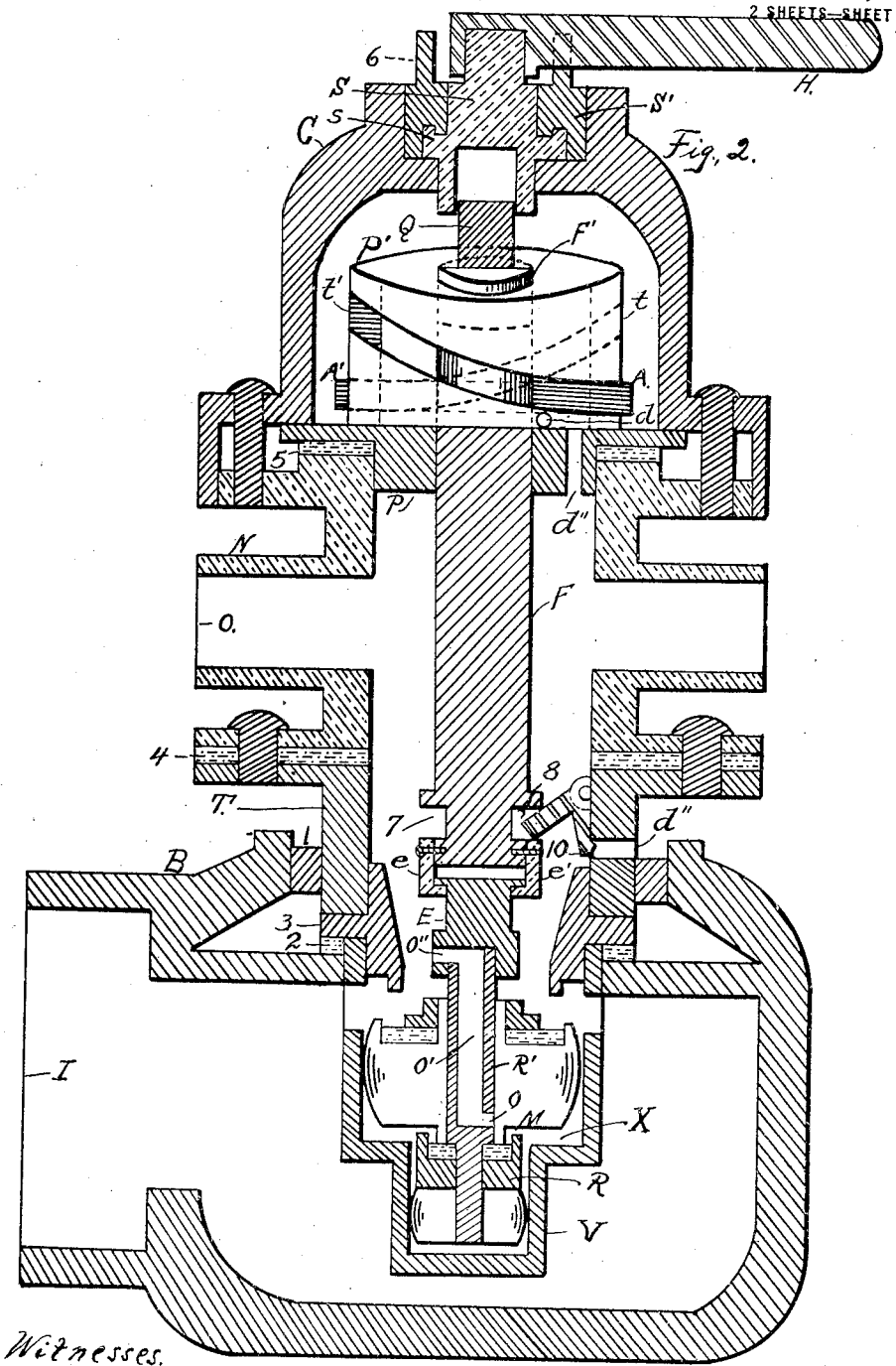

JOHN LINCOLN GISH, OF SOUTH BEND, INDIANA.

VALVE-OPERATING MEANS.

1,354,965. Specification of Letters Patent. Patented Oct. 5, 1920.

Application filed March 18, 1919. Serial No. 283,392.

*To all whom it may concern:*

Be it known that I, JOHN LINCOLN GISH, a citizen of the United States, residing at South Bend, in the county of Saint Joseph and State of Indiana, have invented a new and useful Valve-Operating Means, of which the following is a specification.

The object of my present invention is to construct a "quick operating device" in combination with a duplex valve, in such a manner; that the said duplex valve, is opened or closed, during one turn or less, of the operating wheel or handle, of said "quick operating device."

Figure 1., is a vertical section of my improved apparatus, showing the duplex valve and the quick operating device, in the closed position.

Fig., 2., is a vertical section of my improved apparatus, showing the duplex valve and the quick operating device, in the open position.

Like letters and figures of reference, refer to like parts, in the several figures.

In Fig., 1.,—B., is the valve-body; 1., is a coupling ring; 2., is a gasket; 3., is the valve-seat for the main valve M.; T., is a connecting tube; 4., is a gasket; N., is a nipple; 5., is a gasket; C., is the crown to the valve-body B.; I., is an inlet to the duplex valve M., R., V.; O., is an outlet to the duplex valve M., R., V.; P., is a base-plate provided with a cylinder P'; t., and t', are spiral slots or grooves in part P'; d., and d', are drainage-ways in parts P., and P'; A., A', is an arm engaging the spiral slots t., and t', and attached to the stem F., F'; F., F', is a stem or shaft passing through the central axis of parts P., and P', and connecting parts S., and R'; Q., is the upper end of member F., F'., so arranged, as to rotate with the member S., and at the same time, adapted, to allow a reciprocating movement, within the socket K., of the member S.; S., is a revolving stem or shaft within the member S'., and coöperating with the member F., F'.,—said member S., is adapted to receive and engage an operating handle H., at its outer end,—said member S., at its inner end, is provided with a socket K., adapted, to coöperate, with the part Q., of member F., F.'; s., is a gland disk, on member S., forming a pressure proof bearing with member S'.,—said gland disk s., is provided with a ring y., and an annular groove g.,—said annular groove g., of said disk s., forms, the spacing distance, of said ring y., of said disk s., from, its rotatable operating stem S.,—said annular groove g., of said disk s., is also adapted, to receive the inner ring K.'', of member S.'; S.', is a removable stem-bearing-casing having the member S., therein,—S.', is provided with a stop b., at its outer end, to regulate the arc inscribed by the operating handle H,—S.', is provided, at its inner end, with an outer ring K.', and an inner ring K.'', of unequal heights, with an annular groove K.''', between said rings, K.', and K.'' H., is the operating handle adapted to engage, the outer end of part S.; 7., and 8., is a groove at the lower end of part F., F', adapted to receive the arm of a small stop valve 10., arranged to close the drainage-way d'', when duplex valve M., R., V., is in the open position; e., e', is a coupler joining the lower end of part F., F', to the part E., and adapted to have a sliding contact with part E.; E., is the head of the part R'; R', is the apertured relief valve stem; M., is the main valve; R., is the relief valve; X., is a chamber adapted to house M., and R.; V., is the apertured casing, in the duplex valve; o., o'., o''., is the inlet, the passage-way and the outlet through part R'. (See my prior Patent No., 1042547, for duplex valve.)

In operation, the handle H., rotates the part S., the part S., rotates the part F., F', through the intervention of part Q.; as the part F., F', is rotated upon its axis, the arm A., A', which is attached to the part F., F'. and engaged in the spiral slots t., and t'., is made to follow the curve or lead of said slots t., and t', and in doing so, a reciprocating movement is imparted to the part F., F'. The said reciprocating movement of part F., F', actuates the apertured relief valve stem R'., thus in opening the duplex valve the downward movement of part F., F', imparts a similar downward movement, to the part R'., thereby opening the passageway o., o'., o''., through the apertured relief valve stem R'., this being done, the pressure in the chamber X., is relieved, when by a continued downward movement of parts F., F', and R', the main valve M., is carried away from its valve-seating 3., and when the handle H., has been rotated, one turn or less, and the arm A., A', has been carried the length of the spiral slots $t.$, and $t'$, the duplex valve will be in the open position, with the parts related, as shown in Fig., 2. As the part F., F'., is moved to its open position, the said part F., F'., is adapted, to coöperate with mechanism, whereby the drainage-way $d."$, is closed.

What I do claim as my invention, and desire to secure, by Letters Patent is,—

1. In a valve operating means,—a removable, stem-bearing-casing, said casing provided with a stop at its outer end to regulate the arc inscribed by an operating handle, said casing at its inner end provided with an outer and an inner ring of unequal height, with an annular groove between said rings, said casing provided with a rotatable, operating stem therein, said rotatable stem adapted to receive and engage an operating handle at its outer end, said rotatable stem provided with a gland disk, said disk provided with a ring and an annular groove, said ring of said disk, adapted, to engage the said annular groove of said stem-bearing-casing, said annular groove of said disk, adapted, to receive the inner ring of said stem-bearing-casing, said stationary, rotatable, operating stem coöperating with means adapted to open a reciprocating valve.

2. In a valve operating means,—a baseplate surmounted with a tubular member arranged within a valve-body between the nipple and the crown of said valve-body, said tubular member and base-plate, adapted, to serve as a central guide to a rotatable, reciprocating, connecting stem, adapted, to connect an operating stem with a valve-stem, said tubular member provided with spiral grooves, said grooves, adapted, to receive an engaging member attached to said rotatable, reciprocating, connecting stem, thereby regulating the reciprocating movement of said rotatable, reciprocating, connecting stem;—a rotatable, reciprocating, connecting stem, adapted, to connect an operating-stem with a valve-stem, said connecting stem arranged to pass through the axis of said tubular member and said base-plate, in such a manner as to fill the opening through the said base-plate and the opening through the top of said tubular member, said connecting stem constructed and arranged, at its upper end, to engage said operating stem, in such a manner as to admit, of a reciprocating movement, of the upper end, of said connecting stem within the engaging part of said operating stem, said connecting stem provided with a member, adapted, to engage said spiral grooves in said tubular member, said connecting stem provided with a coupler, at its lower end, adapted, to engage a valve-stem, in such a manner as to admit, of rotation and vertical end movement, between the lower end of said connecting stem and the outer end of said valve-stem;—and a rotatable, operating-stem, said stem, adapted, to receive an operating handle at its outer end, said operating-stem provided with a socket at its inner end, said socket constructed and arranged, to receive and engage, the upper end, of said rotatable, reciprocating, connecting-stem, in such a manner, to admit, of a reciprocating movement, of the upper end, of said connecting-stem, within the said socket, of said operating-stem, as said operating-stem is rotated upon its axis to open a valve, in combination with a valve-body provided with inlet and outlet openings.

3. In a valve operating means,—a removable stem-bearing-casing, said casing provided with a stop at its outer end to regulate the arc inscribed by an operating handle, said casing at its inner end, provided with a ring and an annular bearing surface, said casing provided with a rotatable operating stem therein, said rotatable stem adapted to receive and engage an operating handle at its outer end, said rotatable stem provided with a gland disk, said disk provided with a ring and an annular groove, said ring of said valve disk adapted to engage the said annular bearing surface of said ring of said stem-bearing-casing, said annular groove of said disk, forms, the spacing distance, of said ring, of said disk, from its rotatable operating stem, said rotatable operating stem further provided with mechanism adapted to coöperate with means, to open or close a valve.

In testimony whereof, I have signed my name, to this specification, in the presence of two subscribing witnesses.

JOHN LINCOLN GISH.

Witnesses:
ANNA J. GISH,
F. FLORENCE HILL.